United States Patent
Asoma

(10) Patent No.: US 8,077,224 B2
(45) Date of Patent: Dec. 13, 2011

(54) IMAGING APPARATUS AND IMAGING MODE CONTROL METHOD

(75) Inventor: Akira Asoma, Kanagawa (JP)

(73) Assignee: Sony Corporation, Tokyo (JP)

(*) Notice: Subject to any disclaimer, the term of this patent is extended or adjusted under 35 U.S.C. 154(b) by 295 days.

(21) Appl. No.: 12/509,741

(22) Filed: Jul. 27, 2009

(65) Prior Publication Data
US 2010/0066858 A1    Mar. 18, 2010

(30) Foreign Application Priority Data
Sep. 12, 2008    (JP) .................................. 2008-234510

(51) Int. Cl.
*H04N 5/262* (2006.01)
*H04N 5/235* (2006.01)
*H04N 5/225* (2006.01)

(52) U.S. Cl. ............... 348/239; 348/229.1; 348/362; 348/221.1; 348/216.1; 348/218.1

(58) Field of Classification Search ............... 348/239, 348/222.1, 362, 208.99, 208.4, 208.12, 208.13, 348/229.1, 218.1, 216.1, 364, 366, 221.1
See application file for complete search history.

(56) References Cited

U.S. PATENT DOCUMENTS

| | | | |
|---|---|---|---|
| 5,455,621 A | | 10/1995 | Morimura |
| 6,670,993 B1* | | 12/2003 | Yamamoto et al. ........... 348/362 |
| 6,747,694 B1* | | 6/2004 | Nishikawa et al. ......... 348/229.1 |
| 2003/0095192 A1* | | 5/2003 | Horiuchi .................... 348/222.1 |
| 2006/0033823 A1* | | 2/2006 | Okamura ..................... 348/254 |
| 2008/0231728 A1* | | 9/2008 | Asoma ........................ 348/229.1 |
| 2008/0266424 A1* | | 10/2008 | Asoma ........................... 348/234 |
| 2008/0284872 A1* | | 11/2008 | Asoma ........................ 348/229.1 |
| 2009/0086056 A1* | | 4/2009 | Asoma ........................ 348/229.1 |
| 2009/0086061 A1* | | 4/2009 | Asoma .......................... 348/241 |
| 2009/0086085 A1 | | 4/2009 | Asoma |
| 2009/0153699 A1* | | 6/2009 | Satoh et al. ................ 348/229.1 |

FOREIGN PATENT DOCUMENTS

| | | | |
|---|---|---|---|
| JP | 6-141229 | | 5/1994 |
| JP | 2002-84449 | | 3/2002 |
| JP | 2002-084449 | * | 3/2002 |
| JP | 2004-120205 | | 4/2004 |

* cited by examiner

*Primary Examiner* — Nhan T Tran
(74) *Attorney, Agent, or Firm* — Oblon, Spivak, McClelland, Maier & Neustadt, L.L.P.

(57) ABSTRACT

In an imaging apparatus capable of selectively performing an imaging operation in normal imaging mode and that in composite imaging mode, an object is imaged by performing the imaging operation in normal imaging mode to generate an exposure image signal, a brightness rate of a bright portion and dark portion of the object is calculated by detecting the exposure image signal, an exposure rate, which is a ratio of a long-time exposure time and a short-time exposure time in composite imaging mode, is calculated, and the imaging mode of the imaging apparatus is switched from the normal imaging mode to the composite imaging mode based on a comparison result of the brightness rate and the exposure rate.

4 Claims, 8 Drawing Sheets

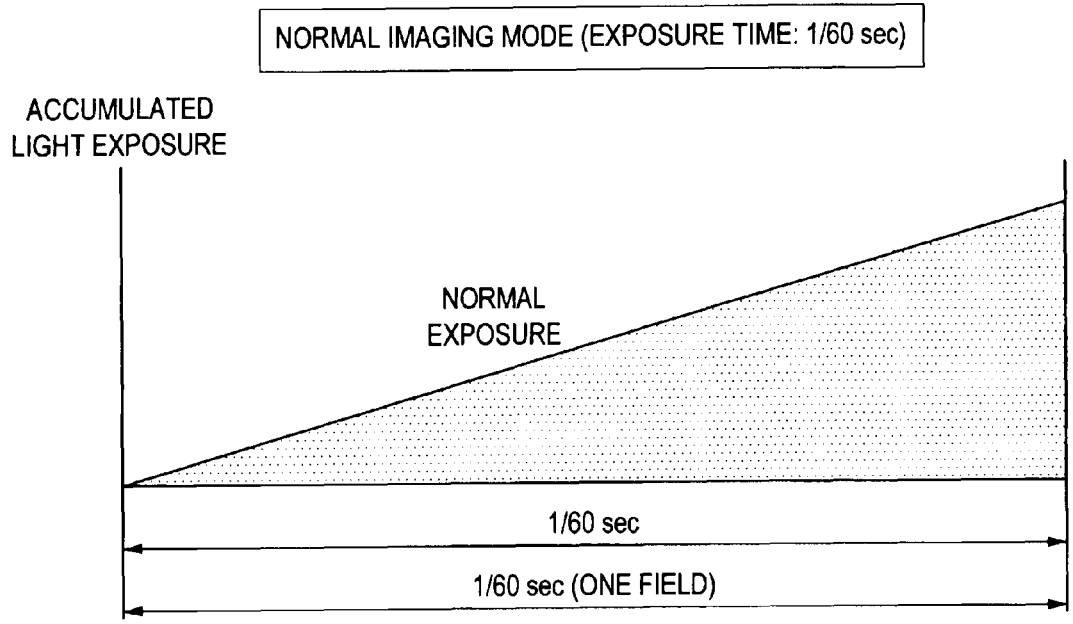
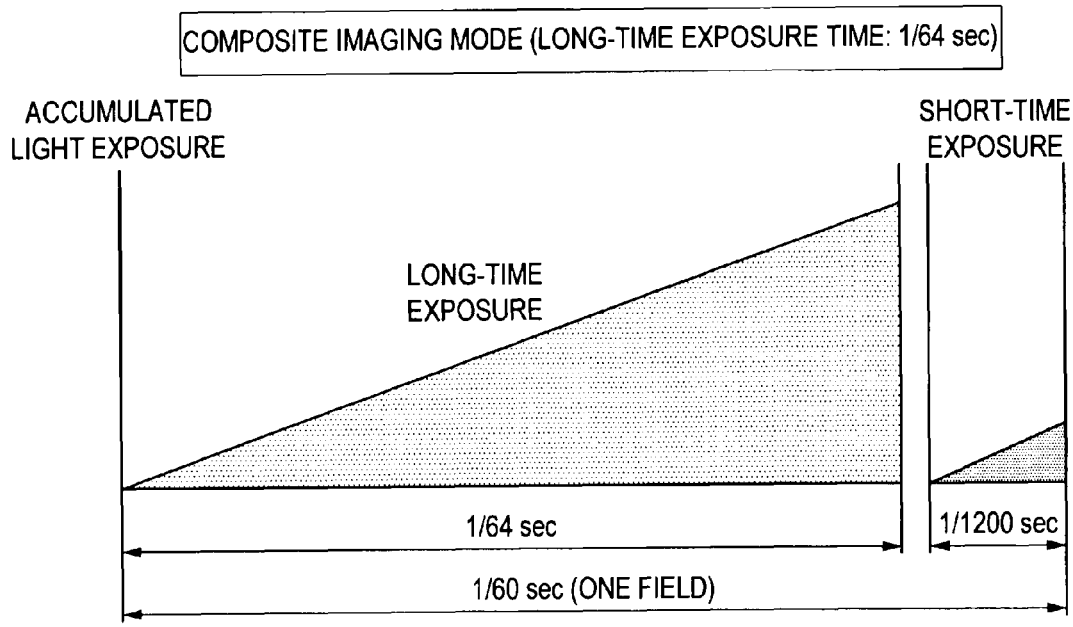

IMAGING APPARATUS AND IMAGING MODE CONTROL METHOD

BACKGROUND OF THE INVENTION

1. Field of the Invention

The present invention relates to an imaging apparatus and an imaging mode control method.

2. Description of the Related Art

In an imaging apparatus in related art using a solid image pickup device such as a CCD (Charge Coupled Device), the quantity of light (light exposure) input into the image pickup device is adjusted by an aperture or electronic shutter speed. That is, when a bright scene is imaged, adjustments are made to reduce the light exposure so that so-called "overexposure" should not occur by an output signal of the image pickup device being saturated. Conversely, in a dark scene, adjustments are made to increase the light exposure so that so-called "underexposure" should not occur.

However, when a scene of high contrast is imaged (for example, backlight imaging or indoor/outdoor simultaneous imaging), there arises an issue described below. That is, due to an insufficient dynamic range of the solid image pickup device to be used, a bright portion is saturated to cause "overexposure" and "underexposure" is caused in a dark portion in which light exposure is insufficient by adjustments of light exposure alone so that it is difficult to properly reproduce both portions.

To solve this issue, a method of using two different electronic shutter speeds within a field has been developed (For example, see Japanese Patent Application Laid-Open No. 6-141229). According to this method, the electronic shutter speed is changed for each field to image information in a bright area and that in a dark area separately and each piece of the obtained information is combined into one image. As an application of the above method, an imaging apparatus (wide dynamic range camera) capable of picking up images in a wide dynamic range is known.

Two kinds of operating states of a wide dynamic range camera are generally known: a composite imaging mode in which wide dynamic range imaging is performed and a normal imaging mode in which wide dynamic range imaging is not performed. However, high contrast in images obtained from the composite imaging mode are frequently lost and it is known that if switched to the composite imaging mode in conditions of a small brightness difference, an unnatural image with reduced contrast of image is obtained. To improve such conditions, a method of automatically switching to the normal imaging mode in conditions of a small brightness difference and to the composite imaging mode in conditions of a great brightness difference has been developed (See, for example, Japanese Patent Application Laid-Open No. 2002-84449 (U.S. Pat. No. 5,455,621)).

SUMMARY OF THE INVENTION

If the exposure time in normal imaging mode is typically fixed, for example, like "1/60 sec", as shown in the above Patent Document 2, the imaging mode can be switched to the composite imaging mode on condition that a brightness difference between a bright area and a dark area is equal to or greater than a predetermined value. However, in an imaging apparatus in which shutter speed priority exposure can be used, the user can set the exposure time (corresponding to the electronic shutter speed) in normal imaging mode to a desired time, for example, "1/60 sec" and "1/120 sec". Here, the shutter speed priority exposure means that exposure is controlled while being fixed to the set electronic shutter speed (exposure time). If, in such an imaging apparatus, only a fixed brightness difference is used, like in Patent Document 2, as a condition for switching from the normal imaging mode to the composite imaging mode, such a condition is not necessarily appropriate from the viewpoint of obtaining an optimum composite image. For example, the imaging mode may not be switched to the composite imaging mode even in a scene in which the wide dynamic range should be applied or conversely, the imaging mode may be switched to the composite imaging mode in a scene in which the wide dynamic range should not be applied.

This issue arises in an imaging system that has time limitations on the long-time exposure time and short-time exposure time when composite images are produced using two different electronic shutter speeds. This is because, in such a system, one field (1/60 sec) is divided to allocate the long-time exposure time and short-time exposure time and thus, the maximum exposure time allocated to each field is limited, thereby the exposure rate being decided in advance.

For example, as shown in FIG. 1 and FIG. 2, an example in which the exposure time in normal imaging mode is set to 1/60 sec and the maximum exposure times in composite imaging mode are set as the long-time exposure time: 1/64 sec and the short-time exposure time: 1/1200 sec is taken. In such an imaging system, a case is considered in which the state (See FIG. 1) in which images are picked up by setting the electronic shutter speed (exposure time) in normal imaging mode to 1/60 sec is switched to the composite imaging mode (See FIG. 2). In this case, the composite imaging mode is started by setting the long-time exposure time to 1/64 sec and the short-time exposure time to 1/1200 sec to maintain the exposure time (1/60 sec) in normal imaging mode. At this point, the exposure rate of the long-time exposure time and the short-time exposure time is about 19 times [≅(1/64)÷(1/1200)], which shows that objects to which appropriate exposure in composite imaging mode can be applied are those whose brightness difference (brightness rate) between a bright portion and a dark portion is about 19 times or more.

On the other hand, a case is considered in which the state (See FIG. 3) in which images are picked up by setting the electronic shutter speed in normal imaging mode to 1/120 sec is switched to the composite imaging mode (See FIG. 4). In this case, the composite imaging mode is started by setting the long-time exposure time to 1/120 sec and the short-time exposure time to 1/1200 sec to maintain the exposure time (1/120 sec) in normal imaging mode. At this point, the exposure rate of the long-time exposure time and the short-time exposure time is about 10 times [≅(1/120)÷(1/1200)], which shows that objects to which appropriate exposure in composite imaging mode can be applied are those whose brightness difference (brightness rate) between a bright portion and a dark portion is about 10 times or more.

Thus, in an imaging apparatus in which the shutter speed in normal imaging mode can be changed to any value due to shutter speed priority exposure or the like, the minimum brightness difference (brightness rate) so that an appropriate image is obtained in composite imaging mode changes depending on the set shutter speed. Thus, according to the method, like Patent Document 2, that uses only a brightness difference (brightness rate) as a condition for switching from the normal imaging mode to the composite imaging mode, it is difficult to appropriately switch from the normal imaging mode to the composite imaging mode so that an appropriate composite image can hardly be obtained.

The present invention has been made in view of the above issue and it is desirable to provide a novel and improved imaging apparatus and imaging mode control method capable of switching from the normal imaging mode to the composite imaging mode under appropriate switching conditions in accordance with the shutter speed (exposure time) set variably in normal imaging mode.

According to an embodiment of the present invention, there is provided an imaging apparatus, including: an imaging processing unit capable of selectively performing an imaging operation in normal imaging mode to generate one exposure image signal in one unit period and an imaging operation in composite imaging mode in which a long-time exposure image signal whose exposure time is relatively long and a short-time exposure image signal whose exposure time is relatively short are generated in the unit period and a composite image signal whose dynamic range is wider than that of at least the long-time exposure image signal or the short-time exposure image signal is generated by combining the long-time exposure image signal and the short-time exposure image signal; and a control unit that switches the imaging mode of the imaging processing unit from the normal imaging mode to the composite imaging mode based on a comparison result of a brightness rate of a bright portion and a dark portion of an object imaged by the imaging processing unit in the normal imaging mode and an exposure rate, which is a ratio of a long-time exposure time and a short-time exposure time in the composite imaging mode.

The control unit may compare a value obtained by multiplying the exposure rate by a gain set in accordance with sensitivity or S/N characteristics of the short-time exposure image signal and the brightness rate and switch the imaging mode from the normal imaging mode to the composite imaging mode if the brightness rate is equal to or greater than the value obtained by multiplying the exposure rate by the gain.

The control unit may compare the brightness rate and a threshold representing a lower limit of the brightness rate at which switching from the normal imaging mode to the composite imaging mode becomes necessary, compare the brightness rate and the exposure rate if the brightness rate is equal to or greater than the threshold, and switch the imaging mode from the normal imaging mode to the composite imaging mode if the brightness rate is equal to or greater than the exposure rate.

The control unit may set the long-time exposure time in the composite imaging mode in accordance with the exposure time set in the normal imaging mode when switched from the normal imaging mode to the composite imaging mode.

According to another embodiment of the present invention, there is provided an imaging mode control method of an imaging apparatus capable of selectively performing an imaging operation in normal imaging mode to generate one exposure image signal in one unit period and an imaging operation in composite imaging mode in which a long-time exposure image signal whose exposure time is relatively long and a short-time exposure image signal whose exposure time is relatively short are generated in the unit period and a composite image signal whose dynamic range is wider than that of at least the long-time exposure image signal or the short-time exposure image signal is generated by combining the long-time exposure image signal and the short-time exposure image signal, including the steps of: calculating a brightness rate of a bright portion and a dark portion of an object by detecting the exposure image signal in the normal imaging mode; calculating an exposure rate, which is a ratio of a long-time exposure time and a short-time exposure time in the composite imaging mode; and switching the imaging mode of the imaging apparatus from the normal imaging mode to the composite imaging mode based on a comparison result of the brightness rate and the exposure rate.

According to the above configuration, in an imaging apparatus capable of selectively performing an imaging operation in normal imaging mode and that in composite imaging mode, an object is imaged by performing the imaging operation in normal imaging mode to generate the exposure image signal, a brightness rate of a bright portion and dark portion of the object is calculated by the exposure image signal being detected, an exposure rate, which is a ratio of a long-time exposure time and a short-time exposure time in composite imaging mode, is calculated, the brightness rate and the exposure rate are compared, and the imaging mode of the imaging apparatus is switched from the normal imaging mode to the composite imaging mode based on a result of the comparison. Accordingly, switching from the normal imaging mode to the composite imaging mode can be controlled by using not only the brightness rate, but also the exposure rate that changes in accordance with the shutter speed (exposure time) variably set in normal imaging mode as determination criteria of mode switching.

According to the embodiments of the present invention described above, the imaging mode can be switched from the normal imaging mode to the composite imaging mode under appropriate switching conditions in accordance with the shutter speed (exposure time) set variably in normal imaging mode.

BRIEF DESCRIPTION OF THE DRAWINGS

FIG. 1 is an explanatory view showing an example of exposure in normal imaging mode according to a first embodiment of the present invention;

FIG. 2 is an explanatory view showing an example of exposure in composite imaging mode according to the embodiment;

DETAILED DESCRIPTION OF THE PREFERRED EMBODIMENTS

Figure 3:
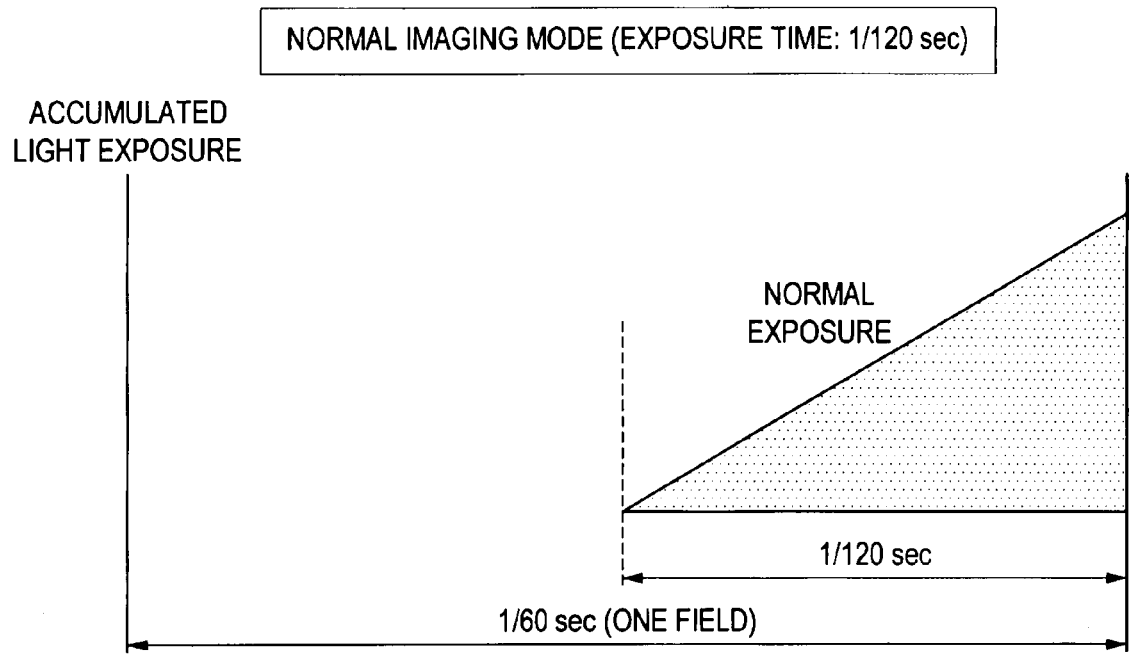
FIG. 3 is an explanatory view showing another example of exposure in normal imaging mode according to the embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be provided in the order shown below:
1. First embodiment (switching mode using the exposure rate)
2. Second embodiment (switching mode using a value obtained by multiplying the exposure rate by a gain)

First Embodiment

First, an imaging apparatus and an imaging method according to the first embodiment of the present invention will be described. In the description that follows, a surveillance camera capable of picking up dynamic images is taken as an example of the imaging apparatus. However, the imaging apparatus according to the first embodiment of the present invention is not limited to such an example and the present invention can be applied to any imaging device such as a digital still camera to pick up still images, digital video camera to pick up dynamic images, and mobile phone with a camera function.

[1. Overview of the Imaging Mode]

First, an overview of the imaging mode in an imaging apparatus according to the first embodiment of the present invention will be provided with reference to FIGS. 1 to 5.

An imaging apparatus in the present embodiment is a camera capable of performing an imaging operation in composite imaging mode as a wide dynamic range camera and is applied, for example, as a surveillance camera set up indoors or outdoors. The imaging apparatus is capable of executing at least two imaging modes, the normal imaging mode and the composite imaging mode.

The normal imaging mode is a normal imaging operation in a general imaging apparatus. In this normal imaging mode, an object is imaged by an image pickup device to generate one exposure image signal in the unit time and predetermined signal processing is performed on the exposure image signal by a signal processing circuit to generate pickup image data. The normal imaging mode is suitable for imaging objects with a relatively small brightness difference between a bright portion and a dark portion within an image.

In this normal imaging mode, however, it is difficult to handle a wide dynamic range ranging from a very dark portion to a very bright portion in an object. For example, when imaged indoors while an outside view is visible during daytime hours in fine weather, an outdoor portion will lose gradations and be overexposed if an indoor object is used as the reference for exposure. Conversely, if an outdoor portion is used as the reference for exposure, indoor objects will be underexposed. That is, if a brightness difference in objects is extremely great, it is difficult to obtain a pickup image corresponding to the dynamic range of brightness thereof.

In composite imaging mode, in contrast, a pickup image having a wide dynamic range without overexposure and underexposure cab be obtained by, for example, changing the shutter speed by the electronic shutter and performing composition processing of a plurality of image signals having different exposure times. In this composite imaging mode, an object is imaged by an image pickup device to generate two exposure image signals (a long-time exposure image signal and a short-time exposure image signal) in the unit time and a composite image signal is generated by combining the long-time exposure image signal and the short-time exposure image signal by a signal processing circuit. Here, the dynamic range of a composite image signal is wider than that of a long-time exposure image signal or a short-time exposure image signal.

The composite imaging mode in which such a wide dynamic range is obtained is suitable for imaging an object in high contrast (for example, backlight imaging or indoor/outdoor simultaneous imaging) and can advantageously prevent the overexposure in a bright portion and the underexposure in a dark portion within an image described above. However, images obtained in composite imaging mode have lower contrast and thus may somewhat create a sense of discomfort visually so that the normal imaging mode is suitable for imaging objects with a small brightness difference. Therefore, images can preferably be picked up by switching the normal imaging mode and composite imaging mode according to user's preferences or purposes of imaging.

FIG. 1 to FIG. 4 show the exposure time and accumulated light exposure (amount of charge) in one field in a solid image pickup device provided with the imaging apparatus according to the present embodiment. The solid image pickup device is, for example, a CCD or CMOS (Complementary Metal Oxide Semiconductor) sensor array.

FIG. 1 shows a case of the normal imaging mode and an exposure is performed in one field period (for example, $\frac{1}{60}$ sec), which is the unit period of imaging. While the exposure time (electronic shutter speed) is set $\frac{1}{60}$ sec in FIG. 1, but the exposure time is naturally not limited to $\frac{1}{60}$ sec. The exposure time corresponds to the electronic shutter speed. Thus, an exposure of a predetermined exposure time is performed in one field period in an image pickup device to obtain an exposure image signal of one field. Predetermined signal processing is performed on the exposure image signal to generate pickup image data of one field.

FIG. 2 shows a case of the composite imaging mode corresponding to the normal imaging mode in FIG. 1, and FIG. 2 shows a case in which a long-time exposure of $\frac{1}{64}$ sec and a short-time exposure of $\frac{1}{1200}$ sec are performed in one field period of $\frac{1}{60}$ sec. The long-time exposure time ($\frac{1}{64}$ sec) in composite imaging mode in FIG. 2 is a value corresponds to the exposure time ($\frac{1}{60}$ sec) in normal imaging mode in FIG. 1. The long-time exposure time and the short-time exposure time are variably controllable. By performing a long-time exposure and a short-time exposure in an image pickup device, long-time exposure image signal and a short-time exposure image signal are obtained in one field period. Then, pickup image data of one field is generated by combining both image signals to obtain a composite image signal. A long-time exposure and a short-time exposure do not necessarily have to be performed in one field period and processing in which a long-time exposure is performed in some field period and a short-time exposure is performed in the next field period to combine each exposure image signal can also be considered.

FIG. 3 shows a case of the normal imaging mode, but the exposure time (electronic shutter speed) is set to $\frac{1}{120}$ sec, which is shorter than the exposure time ($\frac{1}{60}$ sec) in normal imaging mode in FIG. 1. Thus, the exposure time (electronic shutter speed) can be set any value desired by the user to adjust light exposure of an image (shutter speed priority exposure).

Figure 4:
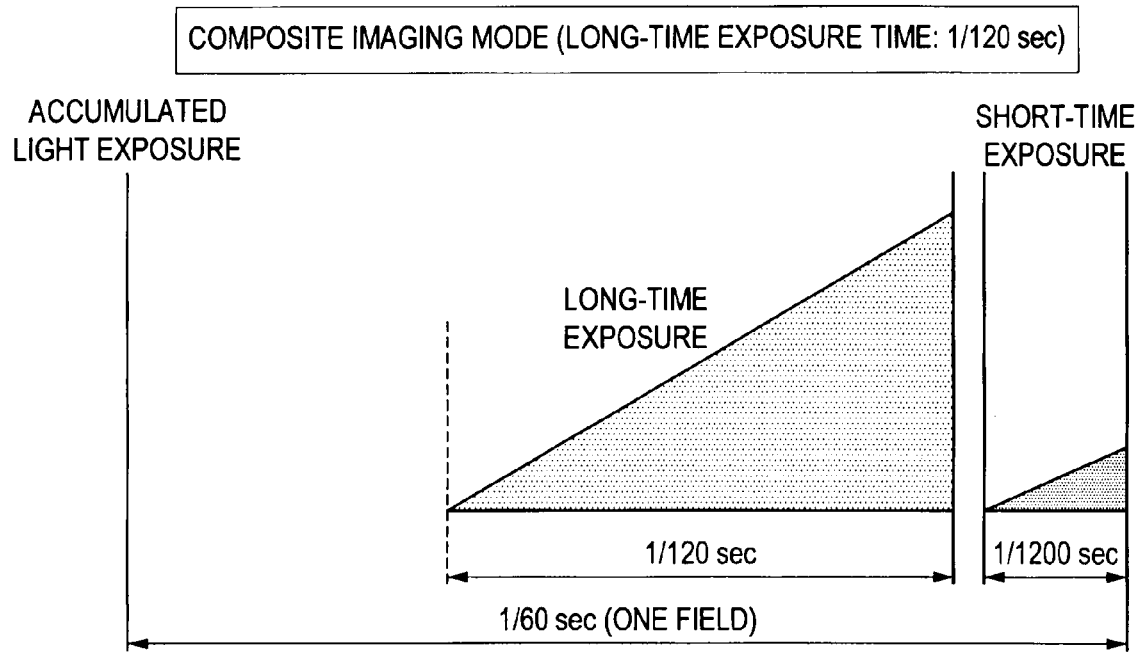
FIG. 4 is an explanatory view showing another example of exposure in normal imaging mode according to the embodiment.

FIG. 4 shows a case of the composite imaging mode corresponding to the normal imaging mode in FIG. 3. In FIG. 4, a long-time exposure of $\frac{1}{120}$ sec and a short-time exposure of $\frac{1}{1200}$ sec are performed in one field period of $\frac{1}{60}$ sec. The long-time exposure time ($\frac{1}{120}$ sec) in composite imaging mode in FIG. 4 is the same as the exposure time ($\frac{1}{120}$ sec) in normal imaging mode in FIG. 3.

As is evident from the relationship between FIG. 1 and FIG. 2, and FIG. 3 and FIG. 4, the exposure time in normal imaging mode and the long-time exposure time in composite imaging mode are linked. That is, when switched from the normal imaging mode to the composite imaging mode, the long-time exposure time in composite imaging mode is set in such a way that the exposure time set in normal imaging mode is maintained as much as possible. In the examples in FIG. 1 and FIG. 2, for example, if the exposure time in normal imaging mode is set to "1/60 sec", the long-time exposure time in composite imaging mode after the transition from the normal imaging mode is set to "1/64 sec", which is almost the same. In the examples in FIG. 3 and FIG. 4, on the other hand, if the exposure time in normal imaging mode is set to "1/120 sec", the long-time exposure time in composite imaging mode after the transition from the normal imaging mode is also set to "1/120 sec". In this manner, the shutter speed desired by the user can be maintained before and after switching the normal imaging mode and the composite imaging mode and also a visual sense of discomfort of a pickup image can be reduced by suppressing a change in light exposure before and after switching the mode.

Figure 5:
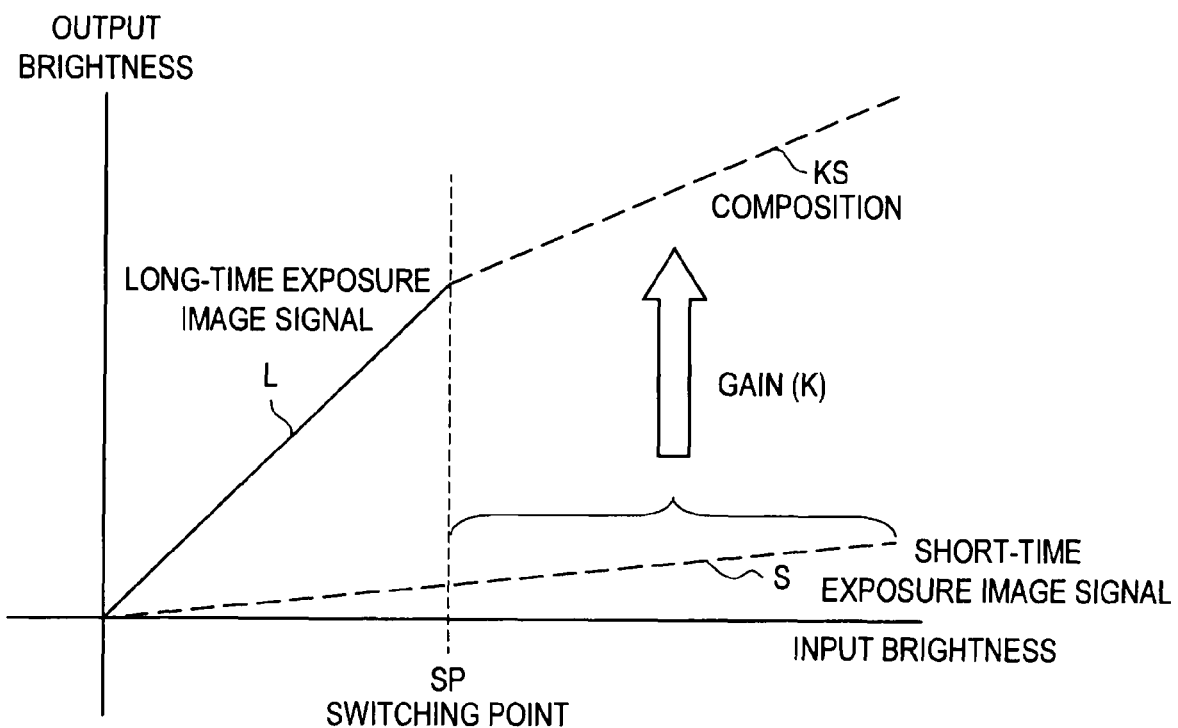
FIG. 5 is an explanatory view of composition processing according to the embodiment.

Here, composition processing of a long-time exposure image signal and a short-time exposure image signal in composite imaging mode will be described with reference to FIG. 5. FIG. 5 shows input/output brightness characteristics L of a long-time exposure image signal and input/output brightness characteristics S of a short-time exposure image signal.

As shown in FIG. 5, for example, a predetermined brightness value is used as a switching point SP in composition processing. Then, pixels of brightness lower than the switching point SP adopt an image signal of a long-time exposure image signal. On the other hand, pixels of brightness higher than the switching point SP adopt an image signal of a short-time exposure image signal. At this point, levels of both images are adjusted by multiplying the short-time exposure image by a gain K, which is an exposure rate (exposure ratio) of the long-time exposure image and the short-time exposure image.

If the exposure rate of the long-time exposure image and the short-time exposure image is 10:1, exposure of the short-time exposure image is 1/10 of that of the long-time exposure image. However, in terms of the amount of light present, the long-time exposure image has ten times the amount of light of a luminance signal level of the short-time exposure image. Therefore, the level of the short-time exposure image signal and that of the long-time exposure image signal are adjusted by multiplying the short-time exposure image signal by 10. The short-time exposure image signal is multiplied by the gain in this manner to obtain, as shown in FIG. 5, characteristics KS whose level is adjusted to that of long-time exposure image signal characteristics.

As a result, a composite image of characteristics L-KS is generated. That is, an image in which there is no underexposure thanks to the long-time exposure image signal in a relatively dark area of an object and there is no overexposure thanks to the short-time exposure image signal in a relatively bright area is obtained as a composite image.

According to the composite imaging mode in which the above techniques are adopted, a dynamic range far wider than that of imaging in normal imaging mode can be obtained. Therefore, an object having a wide dynamic range containing a bright portion and a dark portion in an output image can be imaged, which makes the composite imaging mode suitable when, for example, the interior of a room into which natural light shines or a place with a significant difference of luminance is imaged. More specifically, the composite imaging mode is suitable for imaging doorways of branches of banks, roads for capturing traffic conditions and the like where the dynamic range is significantly different depending on the time zone such as the daytime and nighttime.

In the description that follows, for convenience of description, an exposure operation in normal imaging mode as shown in FIG. 1 or FIG. 3 will be called "normal exposure" to distinguish from "long-time exposure" and "short-time exposure" in composite imaging mode as shown in FIG. 2 or FIG. 4. An exposure image signal obtained in normal exposure mode will be called a "normal exposure image signal" to distinguish from a "long-time exposure image signal" and a "short-time exposure image signal" in composite imaging mode. Further, an exposure time in normal imaging mode will be called a "normal exposure time" to distinguish from a "long-time exposure time" and a "short-time exposure time" in composite imaging mode.

[2. Overview of Imaging Mode Switching]

Next, an overview of the switching method of the normal imaging mode and the composite imaging mode according to the present embodiment will be provided.

As a switching method of the normal imaging mode and the composite imaging mode in related art, as described above, a method (See Patent Document 2) by which the imaging mode is switched to the normal imaging mode in conditions of a small brightness difference and to the composite imaging mode in conditions of a great brightness difference is generally applied. According to such a method, the condition for switching from the normal imaging mode to the composite imaging mode is set whether a brightness difference is equal to or greater than a threshold. However, in an imaging apparatus in which the electronic shutter speed can be changed to any value due to shutter speed priority exposure or the like, it is not appropriate to use, like Patent Document 2, only a brightness difference as a condition for switching to the composite imaging mode. The reason is as follows.

When the imaging mode is switched from the normal imaging mode to the composite imaging mode in the imaging apparatus, the shutter speed (long-time exposure time) in composite imaging mode is set in such a way that the shutter speed (normal exposure time) set in normal imaging mode is maintained as much as possible.

Figure 10:
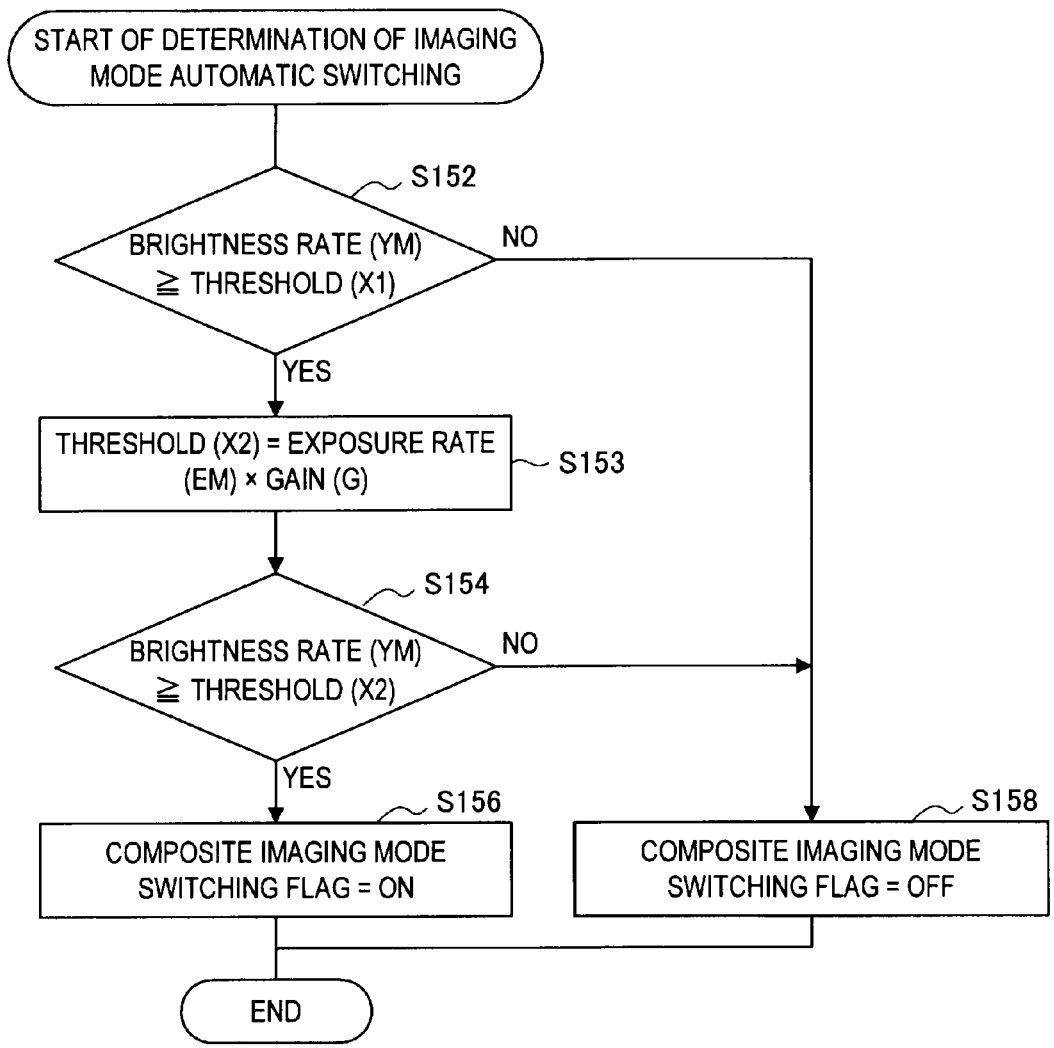
FIG. 10 is a flow chart showing a concrete example of the automatic switching determination processing of the imaging mode according to a second embodiment of the present invention.

Thus, the minimum brightness rate at which an appropriate image is obtained in composite imaging mode is, for example, about 19 times in the examples in FIG. 1 and FIG. 2 and 10 times in the examples in FIG. 3 and FIG. 4, which shows that the minimum brightness rate changes depending on the electronic shutter speed set in normal imaging mode. That is, the minimum brightness rate at which an appropriate image is obtained in composite imaging mode changes depending on the ratio (exposure rate) of the long-time exposure time and short-time exposure time in composite imaging mode. Therefore, if, like Patent Document 2, only a brightness difference (brightness rate) is used as a condition fro switching from the normal imaging mode to the composite imaging mode, it is difficult to switch from the normal imaging mode to the composite imaging mode in appropriate timing. The reason is that the switching condition is not adapted to changes of the electronic shutter speed (normal exposure time) set in normal imaging mode, that is, changes of the exposure rate in composite imaging mode.

Thus, in the present embodiment, two parameters shown below are used as conditions for switching from the normal imaging mode to the composite imaging mode:

(1) Brightness ratio (brightness rate) of a bright portion and a dark portion of an object imaged in normal imaging mode (2) Ratio (exposure rate) of a long-time exposure time and a short-time exposure time in composite imaging mode Accordingly, switching from the normal imaging mode to the composite imaging mode can be controlled using the brightness rate and exposure rate under switching conditions so as to obtain an optimum image. Therefore, the imaging mode can automatically be switched to the composite imaging mode under optimum conditions without being dependent on changes of the shutter speed (exposure time) set due to shutter speed priority exposure or the like in normal imaging mode so that an optimum composite image can be obtained. An imaging apparatus and an imaging method that perform such mode switching will be described below in detail.

[3. Configuration of the Imaging Apparatus]

Figure 6:
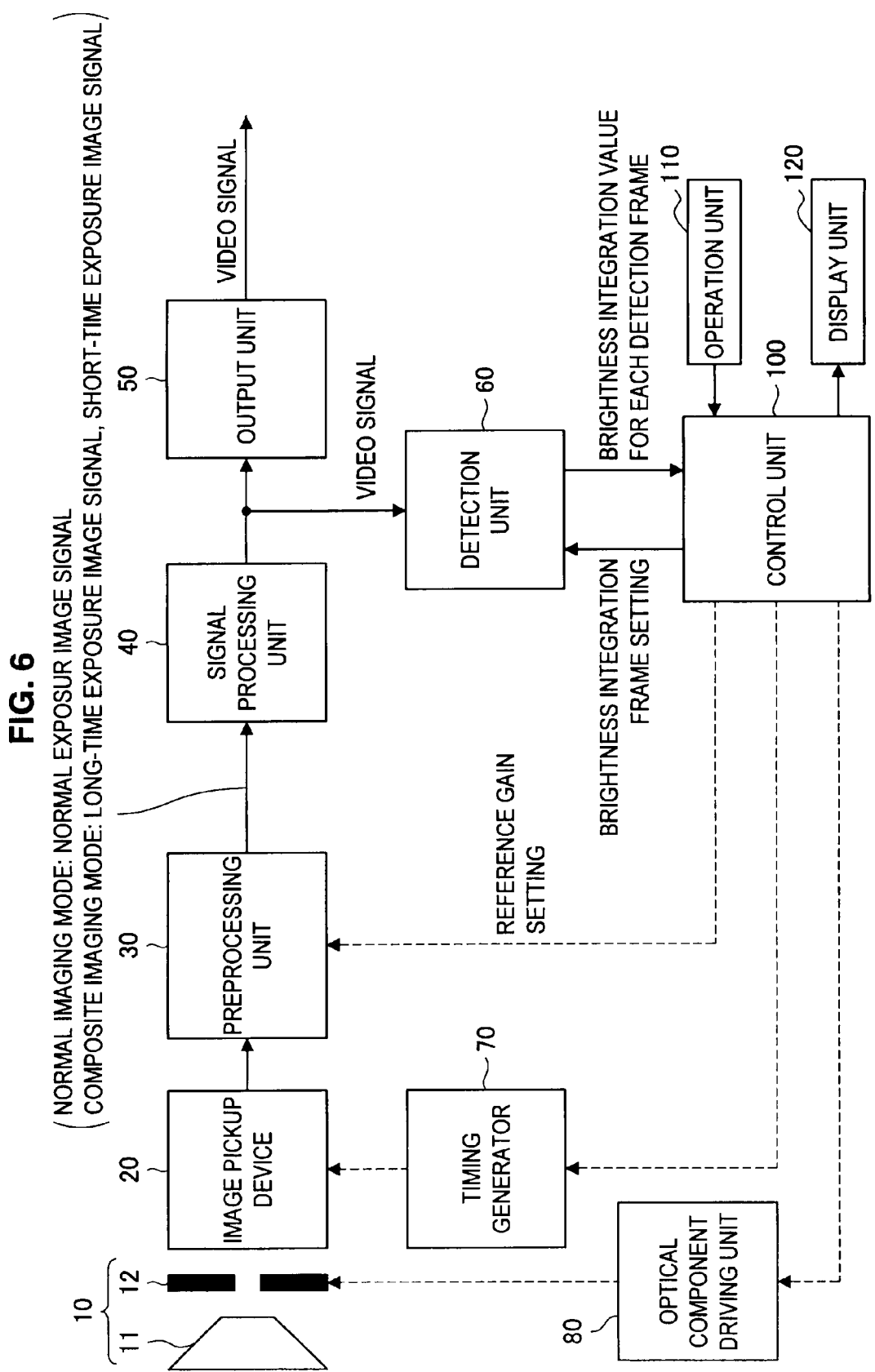
FIG. 6 is a block diagram showing the configuration of an imaging apparatus according to the embodiment.

Next, the configuration of the imaging apparatus according to the present embodiment will be described with reference to FIG. 6. FIG. 6 is a block diagram showing an outline configuration of an imaging apparatus according to the present embodiment.

As shown in FIG. 6, the imaging apparatus includes an imaging optical system 10, an image pickup device 20, a preprocessing unit 30, a signal processing unit 40, an output unit 50, a detection unit 60, a timing generator 70, an optical component driving unit 80, a control unit 100, an operation unit 110, and a display unit 120. Among these units, the imaging optical system 10, the image pickup device 20, the preprocessing unit 30, the signal processing unit 40, the timing generator 70, and the optical component driving unit 80 are concrete examples of the imaging processing unit of the present embodiment. The control unit 100 is a concrete example of the control unit of the present embodiment.

The imaging optical system 10 includes optical components such a lens 11, an optical filter that removes unnecessary wavelengths, and a diaphragm 12. Light incident from an object is led to the image pickup device 20 via optical components in the imaging optical system 10.

The image pickup device 20 is constituted by, for example, a solid image pickup device such as the CCD and CMOS. The image pickup device 20 performs a photoelectric conversion of light via the imaging optical system 10 to output an electric signal as a pickup image. In the present embodiment, the image pickup device 20 performs different exposure processing in normal imaging mode and composite imaging mode. That is, in normal imaging mode, as shown in FIG. 1 and FIG. 3, the image pickup device 20 performs a normal exposure in which an exposure of an object image is performed in a predetermined exposure time in one field period and outputs an electric signal as a normal exposure image signal. On the other hand, in composite imaging mode, as shown in FIG. 2 and FIG. 4, the image pickup device 20 performs a long-time exposure and a short-time exposure in one field period to output a long-time exposure image signal and a short-time exposure image signal in a time divided manner.

The image pickup device 20 is not limited to the constitution using a solid image pickup device. For example, the image pickup device 20 may be constituted by a non-solid image pickup device such as a pickup tube. For a non-solid image pickup device, a long-time exposure and a short-time exposure can be performed using a mechanical shutter or liquid crystal shutter or the exposure time of the normal exposure, long-time exposure and short-time exposure can be changed.

The preprocessing unit 30 is a so-called analog front end that preprocesses an exposure image signal. For example, the preprocessing unit 30 performs CDS (correlated double sampling) processing, gain processing by a programmable gain amplifier (PGA) or A/D conversion processing on an electric signal as a pickup image output from the image pickup device 20. Then, the preprocessing unit 30 supplies the exposure image signal on which the preprocessing has been performed to the signal processing unit 40. That is, the preprocessing unit 30 supplies a normal exposure image signal to the signal processing unit 40 in normal imaging mode and a long-time exposure image signal and a short-time exposure image signal to the signal processing unit 40 in composite imaging mode.

The signal processing unit 40 performs predetermined signal processing for each of the normal imaging mode and the composite imaging mode to generate a video signal of pickup image data. More specifically, in normal imaging mode, the signal processing unit 40 performs, for example, gamma correction processing or white balance processing on an input normal exposure image signal to generate a video signal of pickup image data. On the other hand, in composite imaging mode, the signal processing unit 40 performs composition processing described with reference to FIG. 5 on an input long-time exposure image signal and short-time exposure image signal to generate a composite image signal. That is, the signal processing unit 40 performs timing adjustments of the long-time exposure image signal and short-time exposure image signal supplied in a time divided manner, color balance correction processing, gain processing to match the brightness level of the short-time exposure image signal to that of the long-time exposure image signal and composition processing. The signal processing unit 40 also performs gamma correction processing or white balance processing on a composite image signal to generate a video signal of pickup image data. The signal processing unit 40 outputs a video signal of pickup image data generated in each mode described above to the output unit 50 and the detection unit 60.

The output unit 50 performs processing for the display in a monitor display or processing for transmission to an external device on a video signal of pickup image data input from the signal processing unit 40.

The detection unit 60 performs photometric processing on a video signal of pickup image data input from the signal processing unit 40 to calculate a brightness integrated value, which is supplied to the control unit 100. In this case, the detection unit 60 selects the photometric method to be executed according to instructions from the control unit 100. As the photometric method, for example, the centerweighted metering method, evaluative metering method, averaging metering method, or selective area metering method may be used. While the detection frame inside an image area is different depending on the photometric method, the detection unit 60 supplies the brightness integrated value for each detection frame set by the photometric method to be executed to the control unit 100.

The control unit 100 is constituted by, for example, a micro controller having a CPU (Central Processing Unit), ROM (Read Only Memory), RAM (Random Access Memory), and a flash memory and controls overall operations of the imaging apparatus.

Particularly, the control unit 100 according to the present embodiment exercises control to cause the image pickup device 20, the preprocessing unit 30, the signal processing unit 40, the timing generator 70, and the optical component driving unit 80 as imaging processing units to perform an imaging operation for each of the normal imaging mode and the composite imaging mode. At this point, the control unit 100 determines whether switching conditions are met to control switching of the normal imaging mode and the composite imaging mode.

The control unit 100 also sets the brightness integrated frame (detection frame) for the detection unit 60. Further, the control unit 100 exercises automatic exposure control by adjustments of the diaphragm 12 and the setting of the electronic shutter speed of the image pickup device 20 and the setting of the reference gain of AGC of the preprocessing unit 30. A ROM in the control unit 100 has programs causing the control unit 100 to perform various kinds of control processing described above stored therein and the control unit 100 performs arithmetic/control processing necessary for the control described above based on the programs.

Programs according to the present embodiment are programs that cause the control unit 100, which is a microcomputer, to perform processing (for example, processing in FIG. 7 and FIG. 8 described below) of the control unit 100 described above. The programs can be stored in a storage device (HDD, ROM, flash memory or the like) contained in the imaging apparatus in advance. Such programs may also be stored in a removable recording medium such as a CD, DVD, Blu-ray disk, and memory card before being provided to the imaging apparatus or may be downloaded to the imaging apparatus via a network such as a LAN and the Internet.

The timing generator 70 (hereinafter, referred to as "TG70") generates operation pulses necessary for the image pickup device 20 such as the CCD. For example, the TG70 generates four-phase pulses or field shift pulses for vertical transfer or two-phase pulses or shutter pulses for horizontal transfer, which are supplies to the image pickup device 20. The image pickup device 20 can be driven (electronic shutter function) by the TG70.

Particularly when the normal imaging mode is instructed from the control unit 100, as shown in FIG. 1 and FIG. 3, the TG70 causes the image pickup device 20 to perform a normal exposure of a predetermined time in one field period. If the composite imaging mode is instructed, as shown in FIG. 2 and FIG. 4, the TG70 causes the image pickup device 20 to perform a long-time exposure whose exposure time is relatively long and a short-time exposure whose exposure time is relatively short. Illustrated values for the normal exposure time in normal imaging mode and the long-time exposure time and short-time exposure time in composite imaging mode may be changed to other values.

The optical component driving unit 80 drives optical components in the imaging optical system 10 based on instructions from the control unit 100. In the present embodiment, the optical component driving unit 80 drives at least the diaphragm 12 and functions as a driving circuit unit to adjust the amount of incident light.

The operation unit 110 and the display unit 120 function each as a user interface. The operation unit 110 outputs operation information to the control unit 100 in accordance with a user operation. The display unit 120 displays information to be presented to the user such as the operating state, time information, mode information, and messages in accordance with instructions from the control unit 100. The operation unit 110 and the display unit 120 may be constructed as separate devices from the imaging apparatus. Information to be displayed in the display unit 120 may be superimposed as a character image or letter image on a video signal of pickup image data in the output unit 50 before a monitor display being caused to output and display a pickup image.

In an imaging apparatus according to the present embodiment, as described above, the units 10, 20, 30, 40, 70, and 80 constituting imaging processing units perform an imaging operation in normal imaging mode or composite imaging mode under the control of the control unit 100. In composite imaging mode, a long-time exposure image signal and a short-time exposure image signal are sent from the preprocessing unit 30 to the signal processing unit 40 and both image signals are combined by signal processing unit 40. In normal imaging mode, on the other hand, only a normal exposure image signal (corresponding to a long-time exposure image signal in composite imaging mode) is sent from the preprocessing unit 30 to the signal processing unit 40 and the signal processing unit 40 performs no composition processing. [4. Overall Processing Flow of the Imaging Operation]

Figure 7:
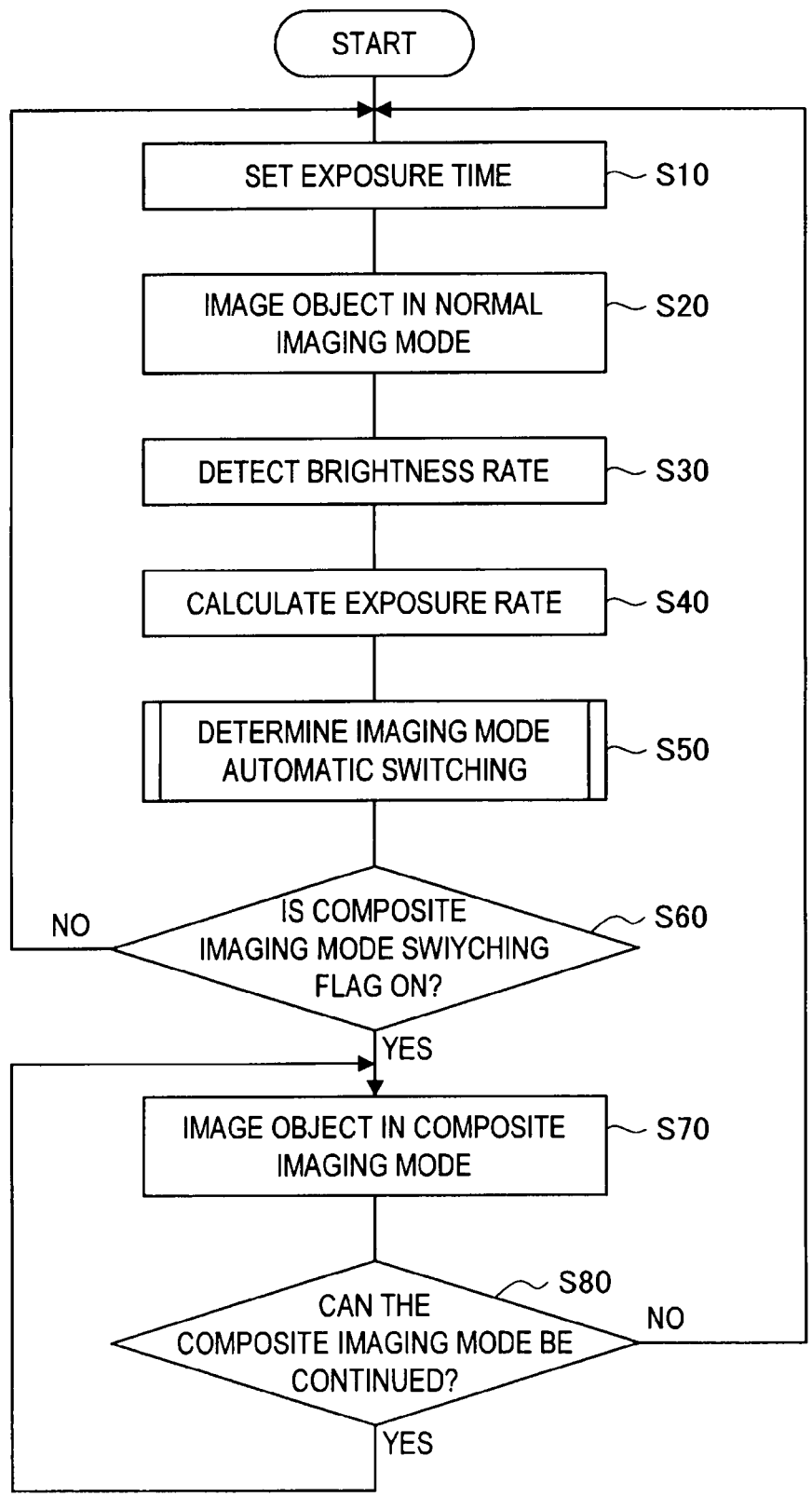
FIG. 7 is a flow chart showing overall processing of an imaging operation by the imaging apparatus according to the embodiment.

Next, an overall processing flow of the imaging operation by an imaging apparatus according to the present embodiment will be described with reference to FIG. 7. FIG. 7 is a flow chart showing overall processing of the imaging operation by the imaging apparatus according to the present embodiment.

As shown in FIG. 7, the control unit 100 of the imaging apparatus first sets the exposure time in the image pickup device 20 when an object is imaged in normal imaging mode (S10). The control unit 100 can change the setting of the exposure time (electronic shutter speed) in accordance with instructions from the user. The user can adjust light exposure of a pickup image by specifying the desired exposure time (electronic shutter speed). If the exposure time becomes longer (the electronic shutter speed becomes slower), light exposure of a pickup image increases so that a dark object can be imaged more suitably. If the exposure time becomes shorter (the electronic shutter speed becomes faster), on the other hand, light exposure of a pickup image decreases so that a bright object or a fast object can be imaged more suitably.

The above shutter speed priority exposure is known as an example in which the exposure time is set according to instructions from the user. The exposure time (electronic shutter speed) is set in the initial state to the default value (for example, 1/60 sec). When the shutter speed priority exposure is used, the control unit 100 can set the exposure time (electronic shutter speed) to a user-desired value such as 1/120 sec, 1/250 sec, and 1/500 sec in accordance with brightness or movement of an object.

Here, an example in which the user manually changes the setting of the exposure time (electronic shutter speed) to make exposure adjustments in accordance with movement of an object or the like is described, but the control unit 100 may automatically adjust the exposure time (electronic shutter speed). If, for example, a pickup image is still bright after the aperture of the diaphragm 12 is maximally reduced, the control unit 100 may automatically switch to a faster shutter speed to make exposure adjustments. Also in a surveillance camera, light exposure can be controlled by using not only the diaphragm 12, but also the shutter speed of the image pickup device 20.

Next, the imaging apparatus performs an imaging operation in normal imaging mode to image an object (S20). In normal imaging mode, the control unit 100 gives the exposure time (electronic shutter speed) set at S10 to the TG70 and the TG70 drives the image pickup device 20 in timing in accordance with the exposure time. The image pickup device 20 images an object in the exposure time (that is, the normal exposure time) set above to generate a normal exposure image signal. In FIG. 1 shown above, one exposure time (1/60 sec) is set in one field and a normal exposure image is picked up in the exposure time of 1/60 sec. In FIG. 3, one exposure time (1/120 sec) is set and a normal exposure image is picked up in the exposure time of 1/60 sec.

In normal imaging mode, the signal processing unit 40 performs signal processing on a normal exposure image signal digitized by the preprocessing unit 30 and then outputs the video signal after the signal processing being performed thereon to the output unit 50 and the detection unit 60. The detection unit 60 detects the video signal from the signal processing unit 40 to add up the brightness value of pixels in the detection frame (brightness integrated frame) and outputs a brightness integrated value to the control unit 100. The control unit 100 uses the brightness integrated value received from the detection unit 60 to determine a difference between the current brightness and the target brightness. Then, based on the brightness difference, the control unit 100 calculates amounts of control necessary for the diaphragm 12, the TG70, and the PGA (programmable gain amplifier) of the preprocessing unit 30 to exercise control to an appropriate exposure (general automatic exposure processing). If, at this point, the imaging apparatus is set to the shutter speed priority exposure, the TG70 retains the value of the exposure time set at S10.

Further, during imaging in normal imaging mode, the control unit 100 typically or periodically determines whether to switch the imaging mode from the normal imaging mode to the composite imaging mode (S30 to S60).

Figure 9:
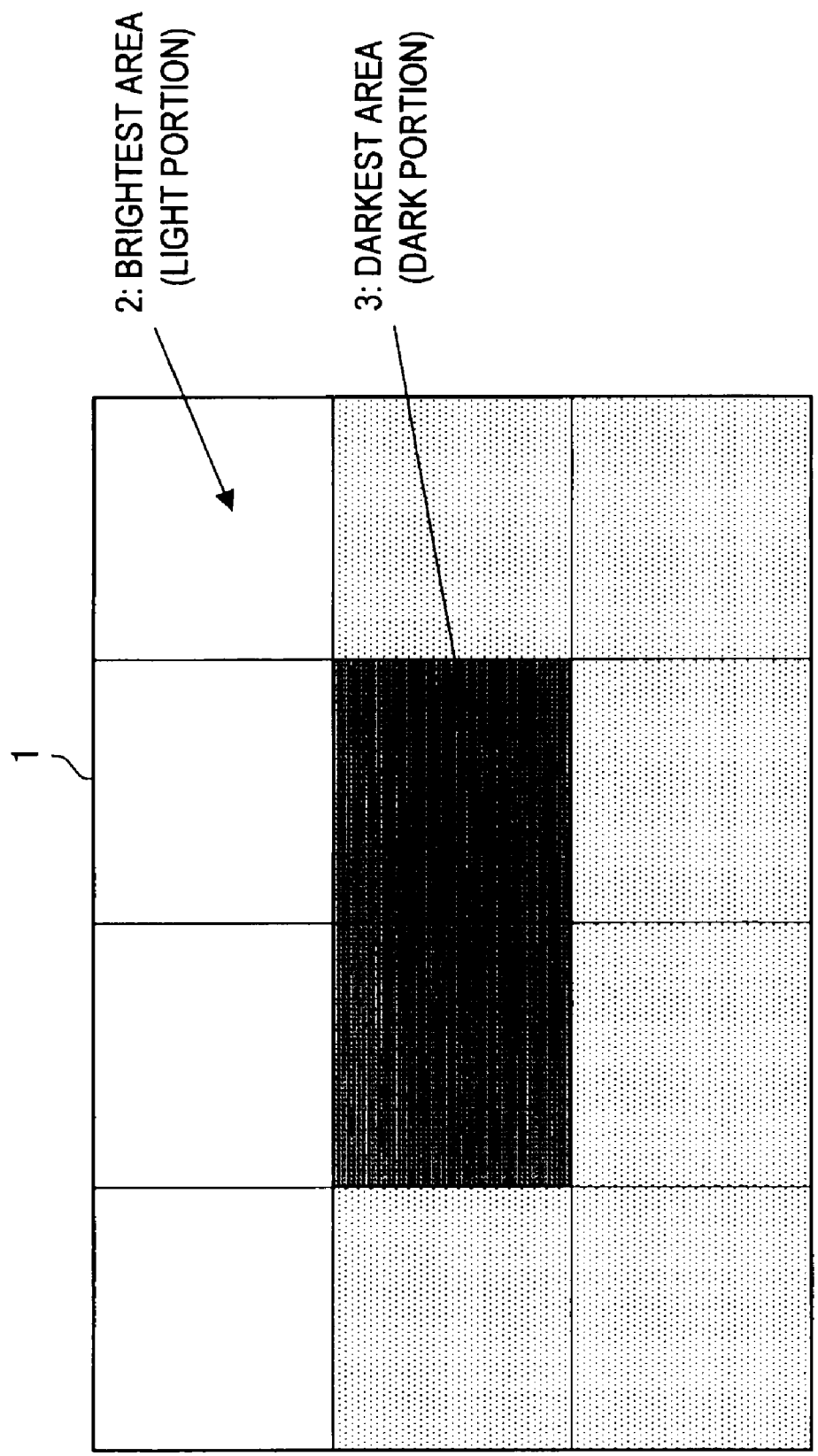
FIG. 9 is an explanatory view of detection processing of a bright portion and a dark portion according to the embodiment.

More specifically, the control unit 100 first detects the brightness rate of a bright portion and a dark portion of an object based on the brightness integrated value of each detection frame obtained by the detection unit 60 (S30). Here, detection processing of a bright portion and a dark portion will be illustrated with reference to FIG. 9. FIG. 9 is an explanatory view showing how an image 1 in which an object is picked up against the light is divided and photometric measurement is made. The image 1 in FIG. 9 is obtained by imaging an object that has a high brightness level in an upper part and a dark portion in the middle (backlight state).

As shown in FIG. 9, the control unit 100 divides an imaging screen into, for example, 12 areas of 4 (horizontal)×3 (vertical) and sets a detection frame of each area for the detection unit 60. The detection unit 60 adds up the brightness value of each set detection frame and outputs the brightness integrated value of each detection frame to the control unit 100. The control unit 100 determines a darkest area (dark portion) 2 and a brightest area (bright portion) 3 in the pickup image 1 based on the brightness integrated value of each detection frame. Then, the control unit 100 determines the brightness rate (YM) by dividing, as shown by the formula shown below, the brightness integrated value (YH) of the brightest area by the brightness integrated value (YL) of the darkest area.

Brightness rate ($YM$)=[brightness integrated value ($YH$) of the brightest area]/[brightness integrated value ($YL$) of the darkest area]

The brightness rate (YM) is the ratio of the brightness of a bright portion of an object imaged in normal imaging mode to that of a dark portion. The calculation method of the brightness rate is not limited to the above example and can be changed when necessary. For example, the setting of detection frames is not limited to the example in FIG. 9 and more or less detection frames may be set in any arrangement. Moreover, instead of determining the brightness integrated value for each detection frame, an average brightness value for each detection frame may be determined.

Next, the control unit 100 determines in advance the exposure rate when the imaging mode is switched from the normal imaging mode to the composite imaging mode in the current state in which an object is imaged (S40). As described above, the exposure rate is the ratio (exposure ratio) of the long-time exposure time (TL) and the short-time exposure time (TS) in composite imaging mode. The control unit 100 determines in advance the exposure rate (EM) when switched to the composite imaging mode while retaining the exposure time (shutter speed) in the current normal imaging mode using the formula shown below.

Exposure rate ($EM$)=long-time exposure time ($TL$)/ short-time exposure time ($TS$)

For example, a case in which the normal exposure time (shutter speed) in normal imaging mode is set to $\frac{1}{60}$ sec will be considered (See FIG. 1). If, in this case, the imaging mode is switched from the normal imaging mode to the composite imaging mode by retaining the setting state, the long-time exposure time in composite imaging mode is maintained to $\frac{1}{64}$ sec, which is close to the normal exposure time ($\frac{1}{60}$ sec), and the short-time exposure time is set to $\frac{1}{1200}$ sec (See FIG. 2). Thus, the exposure rate in this case is about 19 times.

Also a case in which the normal exposure time (shutter speed) in normal imaging mode is set to $\frac{1}{120}$ sec will be considered (See FIG. 3). If, in this case, the imaging mode is switched from the normal imaging mode to the composite imaging mode by retaining the setting state, the long-time exposure time in composite imaging mode is maintained to $\frac{1}{120}$ sec, which is the same as the normal exposure time ($\frac{1}{120}$ sec), and the short-time exposure time is set to $\frac{1}{1200}$ sec (See FIG. 4). Thus, the exposure rate in this case is 10 times.

If the normal exposure time (shutter speed) is set to another value, for example, $\frac{1}{250}$ sec, $\frac{1}{500}$ sec or the like, the exposure rate when switched to the composite imaging mode can be calculated in the same manner in advance. The exposure rate does not necessarily have to be calculated in timing of step S40. For example, the exposure rate corresponding to the setting value of each normal exposure time may be calculated in advance (for example, when manufactured/shipped, power is turned on, or the normal exposure time is changed) and stored in a memory (not shown), which is read from the memory and used for switching determination of the next imaging mode.

Next, the control unit 100 uses the brightness rate (YM) and the exposure rate (EM) calculated above to determine whether to switch the imaging mode from the normal imaging mode to the composite imaging mode (S50). Here, if the brightness rate (YM) is equal to or greater than the exposure rate (EM), the control unit 100 determines to switch the imaging mode to the composite imaging mode and sets a composite imaging mode switching flag to ON. If, on the other hand, the brightness rate (YM) is less than the exposure rate (EM), the control unit 100 determines not to switch the imaging mode to the composite imaging mode and leaves the composite imaging mode switching flag OFF. Details of automatic switching determination processing at step S50 will be described below (See FIG. 8).

Next, the control unit 100 determines the imaging mode following a result of the determination at S50 (S60). That is, if the composite imaging mode switching flag is OFF, the control unit 100 returns to S10 without switching the imaging mode to the composite imaging mode to continue imaging processing in normal imaging mode (S10 to S50). If, on the other hand, the composite imaging mode switching flag is ON (S60), the control unit 100 switches the imaging mode from the normal imaging mode to the composite imaging mode and proceeds to S70 to start imaging processing in composite imaging mode.

At S70, the imaging apparatus performs an imaging operation in composite imaging mode to image an object (S70). As described above, the TG70 can set two different electronic shutter speeds and accordingly, the imaging apparatus can generate two exposure image signals (that is, a long-time exposure image signal and a short-time exposure image signal) with different light exposures.

In composite imaging mode, the control unit 100 gives the long-time exposure time corresponding to the normal exposure time (electronic shutter speed) set at S10 and the predetermined short-time exposure time to the TG70 and the TG70 drives the image pickup device 20 in timing in accordance with these exposure times. The image pickup device 20 images an object in the long-time exposure time and the short-time exposure time to generate long-time exposure image signal and a short-time exposure image signal. The signal processing unit 40 combines the long-time exposure image signal and the short-time exposure image signal digitized by the preprocessing unit 30, as shown in FIG. 5, at a specific switching point SP to generate a composite image signal whose dynamic range has been expanded. Then, the signal processing unit 40 performs a predetermined signal processing on the composite image signal to generate a video signal of pickup image data, which is output to the output unit 50 and the detection unit 60.

The detection unit 60 detects a video signal from the signal processing unit 40 to add up the brightness value of pixels in the detection frame (brightness integrated frame) and outputs a brightness integrated value to the control unit 100. The control unit 100 uses the brightness integrated value received from the detection unit 60 to determine a difference between the current brightness and the target brightness. Then, based on the brightness difference, the control unit 100 calculates amounts of control necessary for the diaphragm 12, the TG70, and the PGA (programmable gain amplifier) of the preprocessing unit 30 to exercise control to an appropriate exposure (general automatic exposure processing). If, at this point, the imaging apparatus is set to the shutter speed priority exposure, the TG70 sets the long-time exposure time in composite imaging mode so that the value of the normal exposure time in normal imaging mode set at S10 is retained.

FIG. 2 shown above is a case in which two different exposure times (1/64 sec and 1/1200 sec) are set in one field in composite imaging mode and the image pickup device 20 generates two exposure image signals with different light exposures. That is, a long-time exposure image whose exposure time is 1/64 sec and a short-time exposure image whose exposure time is 1/1200 sec are picked up. In FIG. 4 shown above, a long-time exposure image whose exposure time is 1/120 sec and a short-time exposure image whose exposure time is 1/1200 sec are picked up in composite imaging mode. Values corresponding to the normal exposure time in normal exposure mode set at S10 are used as the long-time exposure times in FIG. 2 and FIG. 4. Thus, when the shutter speed priority exposure or the like is applied, the normal exposure time in normal exposure mode is reflected in the long-time exposure time in composite imaging mode so that changes in quality when the imaging mode is switched can be reduced.

Then, at S80, the control unit 100 determines whether to continue the composite imaging mode, that is, whether to switch from the composite imaging mode to the normal imaging mode based on the brightness value detected by the detection unit 60 (S80). More specifically, if, for example, certain changes of brightness are detected after completion of automatic exposure processing in composite imaging mode at S70, the control unit 100 terminates the composite imaging mode to cause a transition to the normal imaging mode. If the composite imaging mode should be continued, S70 and S80 described above are repeated and if the imaging mode should be switched to the normal imaging mode, S10 to S60 described above are repeated.

[5. Flow of Mode Switching Determination Processing]

Figure 8:
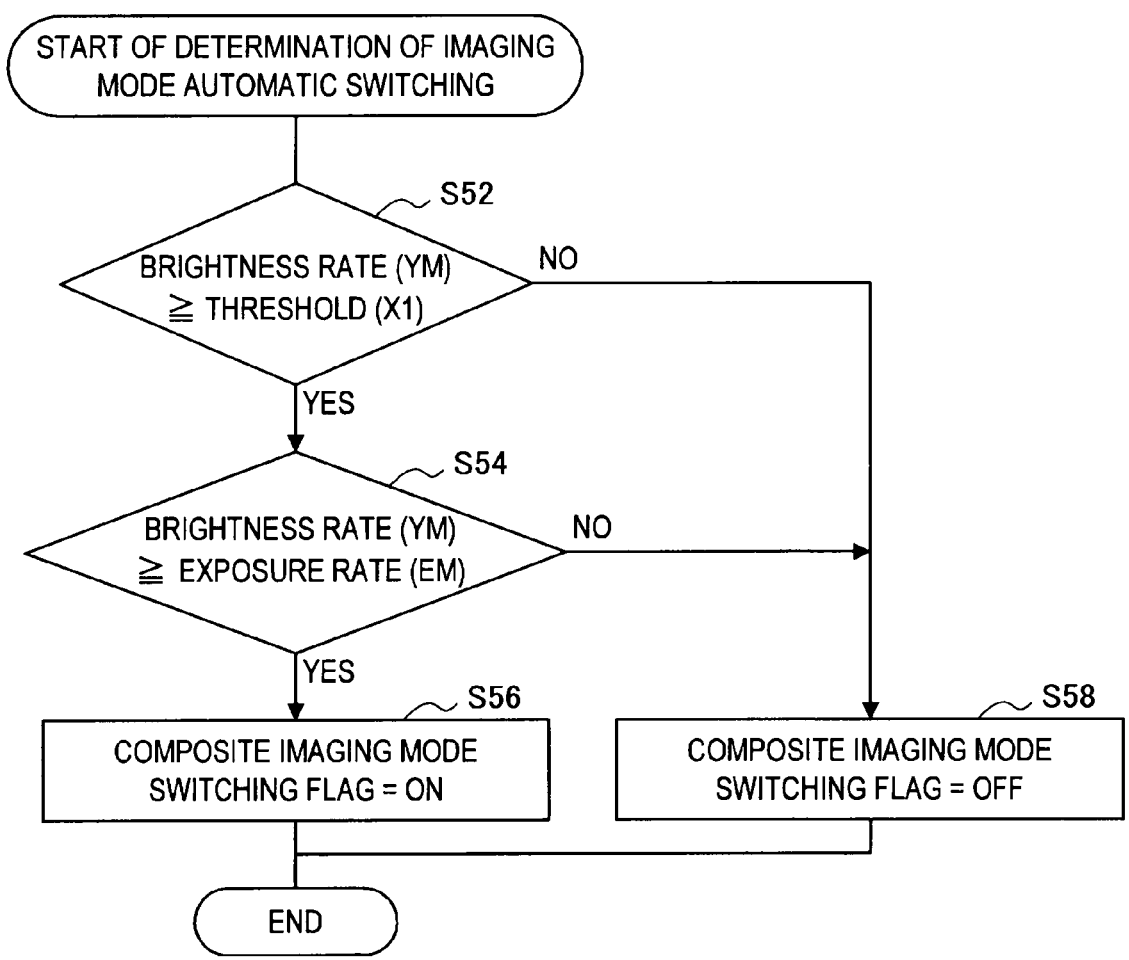
FIG. 8 is a flow chart showing a concrete example of automatic switching determination processing of the imaging mode according to the embodiment.

Next, automatic switching determination processing from the normal imaging mode to the composite imaging mode according to the present embodiment will be described in detail with reference to FIG. 8. FIG. 8 is a flow chart showing a concrete example of automatic switching determination processing (S50) of the imaging mode in FIG. 7.

As shown in FIG. 8, the control unit 100 first compares the brightness rate (YM) obtained at S30 and a threshold (X1) to determine whether the brightness rate (YM) is equal to or greater than the threshold (X1) (S52: primary determination of mode switching). Here, the threshold (X1) is a value showing the lower limit of the brightness rate at which switching from the normal imaging mode to the composite imaging mode becomes necessary. The threshold (X1) is set to the lowest brightness rate value that makes the composite imaging mode necessary in accordance with performance of the imaging apparatus. If, for example, the imaging apparatus has performance that causes neither overexposure nor underexposure in a pickup image even in normal imaging mode when the brightness rate is about five times, the threshold (X1) is set, for example, to 6.

Thus, whether the brightness rate of an object being imaged in normal imaging mode is a brightness rate that makes application of the composite imaging mode necessary can be determined at step S52. Therefore, erroneous switching to the composite imaging mode can be prevented when an object with a low brightness rate, which makes application of the composite imaging mode unnecessary, is imaged in normal imaging mode.

If, as a result of the primary determination at S52, the brightness rate (YM) is less than the threshold (X1), switching to the composite imaging mode is unnecessary and the control unit 100 proceeds to S58 and leaves the composite imaging mode switching flag OFF (S58). The switching flag is a flag representing switching from the normal imaging mode to the composite imaging mode and is stored, for example, in the RAM of the control unit 100. If, on the other hand, the brightness rate (YM) is equal to or greater than the threshold (X1), this means that an object being imaged has the lowest brightness rate that makes the composite imaging mode necessary and thus, the control unit 100 proceeds to S54.

Next, at S54, the control unit 100 compares the brightness rate (YM) and the exposure rate (EM) obtained at S40 to determine whether the brightness rate (YM) is equal to or greater than the exposure rate (EM) (S54: secondary determination of mode switching).

If, as a result of the secondary determination at S54, the brightness rate (YM) is equal to or greater than the exposure rate (EM), the imaging mode should be switched to the composite imaging mode and the control unit 100 proceeds to S56 and changes the setting of the composite imaging mode switching flag to ON from OFF (S56). As a result, the imaging mode is switched from the normal imaging mode to the composite imaging mode. If, on the other hand, the brightness rate (YM) is less than the exposure rate (EM), the imaging mode should not be switched to the composite imaging mode and the control unit 100 proceeds to S58 and leaves the composite imaging mode switching flag OFF (S58). As a result, the imaging mode is not switched to the composite imaging mode and the normal imaging mode is maintained.

Thus, in the present embodiment, if the brightness rate (YM) is equal to or greater than the exposure rate (EM), the imaging mode is switched from the normal imaging mode to the composite imaging mode. This is because the brightness rate (YM) at which an optimum image is obtained in composite imaging mode changes with respect to the exposure rate (EM). That is, the long-time exposure time in composite imaging mode depends on the normal exposure time (electronic shutter speed) set in normal imaging mode and therefore, the exposure rate (EM) in composite imaging mode changes depending on the normal exposure time. If the exposure rate (EM) is high, the brightness rate (YM) at which an optimum image is obtained in composite imaging mode is also high and conversely, if the exposure rate (EM) is low, the brightness rate (YM) at which an optimum image is obtained in composite imaging mode is also low. Thus, the brightness rate (YM) being equal to or greater than the exposure rate (EM) is preferably set as the condition for switching to the composite imaging mode.

If, for example, as shown in FIG. 1 and FIG. 2, the normal exposure time (electronic shutter speed) in normal imaging mode is set to 1/60 sec, the long-time exposure time is 1/64 sec and the short-time exposure time is 1/1200 sec after a transition to the composite imaging mode occurs. In this case, the exposure rate (EM) is obtained as "long-time exposure time/short-time exposure time=about 19 times". Therefore, when the brightness rate (YM) of an object being imaged in normal imaging mode becomes about 19 times or more, it is preferable to switch from the normal imaging mode to the composite imaging mode because an optimum image is obtained in composite imaging mode.

If, on the other hand, as shown in FIG. 3 and FIG. 4, the normal exposure time (shutter speed) in normal imaging mode is set to 1/120 sec, the long-time exposure time is 1/120 sec and the short-time exposure time is 1/1200 sec after a transition to the composite imaging mode occurs. In this case, the exposure rate (EM) is obtained as "long-time exposure time/short-time exposure time=10 times". Therefore, when the brightness rate (YM) of an object being imaged in normal imaging mode becomes 10 times or more, it is preferable to switch from the normal imaging mode to the composite imaging mode because an optimum image is obtained in composite imaging mode.

Thus, in the present embodiment, not only the threshold (X1) of the brightness rate of a bright portion and a dark portion of an object being imaged, but also the exposure rate (EM) in composite imaging mode is used as conditions for switching from the normal imaging mode to the composite imaging mode. When the brightness rate (YM) actually measured in normal imaging mode becomes equal to or greater than the exposure rate (EM), the imaging mode is switched from the normal imaging mode to the composite imaging mode. Accordingly, the imaging mode can be switched to the composite imaging mode in appropriate timing in accordance with the shutter speed (exposure time) set arbitrarily even if the shutter speed (exposure time) changes by user settings due to the shutter speed priority exposure described above or the like.

Second Embodiment

Next, an imaging apparatus and an imaging method according to the second embodiment of the present invention will be described. When compared with the first embodiment described above, the second embodiment is different in switching conditions of mode switching determination processing and the other function configuration is substantially the same as that of the first embodiment and thus, a detailed description thereof is omitted.

[6. Flow of Mode Switching Determination Processing]

Next, automatic switching determination processing from the normal imaging mode to the composite imaging mode according to the second embodiment of the present invention will be described in detail with reference to FIG. 10. FIG. 10 is a flow chart showing the automatic switching determination processing of the imaging mode according to the second embodiment. The processing flow in FIG. 10 corresponds to the automatic switching determination processing (S50) of the imaging mode in FIG. 7 according to the first embodiment.

In the second embodiment, as shown in FIG. 10, instead of comparing the exposure rate (EM) directly with the brightness rate (YM) like in the first embodiment, a threshold (X2) obtained by multiplying the exposure rate (EM) by a gain (G) is compared with the brightness rate (YM). A method like the first embodiment by which the imaging mode is automatically switched to the composite imaging mode when the brightness rate (YM) is equal to or greater than the exposure rate (EM) is simpler. However, in an actual imaging apparatus, it is necessary to adjust determination criteria for mode switching in accordance with sensitivity and S/N characteristics of a short-time exposure image signal output from the image pickup device 20. Thus, in the second embodiment, the exposure rate (EM) is multiplied by the gain (G) at S153 to determine the threshold (X2) for switching determination and the threshold (X2) and the brightness rate (YM) are compared at S154. The flow in FIG. 10 will be described below in detail.

First, the control unit 100 compares the brightness rate (YM) obtained at S30 in FIG. 7 with the threshold (X1) to determine whether the brightness rate is equal to or greater than the threshold (X1) (S152: primary determination of mode switching). S152 is substantially the same as S52 and thus, a detailed description is omitted. If the brightness rate is equal to or greater than the threshold (X1), the control unit 100 proceeds to S153.

Next, at S153, the threshold (X2) is calculated by multiplying the exposure rate (EM) obtained at S40 in FIG. 7 by the gain (G) (S153). The gain (G) is set to an appropriate value in accordance with sensitivity or S/N characteristics of a short-time exposure image signal output from the image pickup device 20 in composite imaging mode. By adjusting the gain (G), conditions for switching from the normal imaging mode to the composite imaging mode can be controlled.

If, for example, sensitivity and S/N of a short-time exposure image signal are good (for example, the noise reduction function is effective) thanks to characteristics of the image pickup device 20, an appropriate composite image is obtained in composite imaging mode even if the brightness rate (YM) is smaller than the exposure rate (EM). Therefore, the threshold (X2) can be made smaller than the exposure rate (EM) by setting the gain (G) lower (that is, it is necessary to set to a value less than 1 (for example, 0.8)). Accordingly, when an object whose brightness rate (YM) gradually increases is imaged, a suitable composite image with a wide dynamic range can be obtained by advancing timing of switching from the normal imaging mode to the composite imaging mode.

If, on the other hand, sensitivity and S/N of a short-time exposure image signal are bad, it is difficult to obtain an appropriate composite image in composite imaging mode unless the brightness rate (YM) is greater than the exposure rate (EM). Therefore, it is necessary to set the gain (G) higher (that is, it is necessary to set to a value greater than 1 (for example, 1.2)) to make the threshold (X2) greater than the exposure rate (EM). Accordingly, when an object whose brightness rate (YM) gradually increases is imaged, the imaging mode can be switched to the composite imaging mode after the appropriate brightness rate to obtain an appropriate composite image is reached by delaying timing of switching from the normal imaging mode to the composite imaging mode.

The gain (G) can also be applied as a level for automatic switching determination. For example, a plurality of switching determination levels such as the low sensitivity (G=1.2), ordinary sensitivity (G=1), and high sensitivity (G=0.8) may be prepared so that the user can select and set these determination levels in accordance with an imaging environment. Accordingly, the user can select the conditions for automatic switching from the normal imaging mode to the composite imaging mode so that the timing for automatic switching from the normal imaging mode to the composite imaging mode can be optimized.

Next, at S154, the control unit 100 compares the brightness rate (YM) and the threshold (X2) obtained at S153 to determine whether the brightness rate (YM) is equal to or greater than the threshold (X2) (S154: secondary determination of mode switching).

If, as a result of the secondary determination at S154, the brightness rate (YM) is less than the threshold (X2), the imaging mode should not be switched to the composite imaging mode and the control unit 100 proceeds to S158 and leaves the composite imaging mode switching flag OFF (S158). If, on the other hand, the brightness rate (YM) is equal to or greater than the threshold (X2), the imaging mode should be switched to the composite imaging mode and the control unit 100 proceeds to S156 and changes the setting of the composite imaging mode switching flag from OFF to ON (S156).

Thus, in the present embodiment, if the brightness rate (YM) is equal to or greater than the threshold (X2) obtained by multiplying the exposure rate (EM) by the gain (G), the imaging mode is switched from the normal imaging mode to the composite imaging mode.

If, for example, as shown in FIG. 1 and FIG. 2, the normal exposure time (electronic shutter speed) in normal imaging mode is set to 1/60 sec, the exposure rate (EM) is obtained as "long-time exposure time/short-time exposure time=18.75 times". Here, if the gain (G) is 0.8, the threshold (X2) is calculated as 18.75×0.8=15. Therefore, when the brightness rate (YM) of an object being imaged in normal imaging mode becomes 15 times or more, an optimum image is obtained in composite imaging mode and it is preferable to switch from the normal imaging mode to the composite imaging mode.

If, on the other hand, as shown in FIG. 3 and FIG. 4, the normal exposure time (shutter speed) in normal imaging mode is set to 1/120 sec, the exposure rate (EM) is obtained as "long-time exposure time/short-time exposure time=10 times". Thus, the threshold (X2) is calculated as 10×0.8=8. Therefore, when the brightness rate (YM) of an object being imaged in normal imaging mode becomes 8 times or more, an optimum image is obtained in composite imaging mode and it is preferable to switch from the normal imaging mode to the composite imaging mode.

Thus, in the second embodiment, the threshold (X2) obtained by multiplying the exposure rate (EM) by the gain (G) is used as a condition for switching from the normal imaging mode to the composite imaging mode. When the brightness rate (YM) actually measured in normal imaging mode becomes equal to or greater than the threshold (X2), the imaging mode is switched from the normal imaging mode to the composite imaging mode. Accordingly, the imaging mode can be switched in appropriate timing in accordance with the shutter speed (exposure time) set arbitrarily even if the shutter speed (exposure time) changes by user settings due to the shutter speed priority exposure described above or the like.

Sensitivity or S/N characteristics of a short-time exposure image signal change in accordance with characteristics of an imaging processing unit (for example, the image pickup device 20) of an imaging apparatus and also the brightness rate (YM) at which an optimum composite image can be obtained in composite imaging mode changes in accordance with the sensitivity or S/N characteristics. Thus, in the second embodiment, the gain (G) is set in accordance with sensitivity or S/N characteristics of a short-time exposure image signal and the threshold (X2) obtained by multiplying the exposure rate (EM) by the gain (G) is compared with the brightness rate (YM). Then, that the brightness rate (YM) becomes equal to or greater than the threshold (X2) can be used as a condition for switching to the composite imaging mode. Accordingly, automatic switching timing to the composite imaging mode can appropriately be adjusted in accordance with characteristics of an imaging processing unit (for example, the image pickup device 20) or sensitivity or S/N characteristics of a generated short-time exposure image signal. If, for example, the sensitivity or S/N characteristics are good, the imaging mode can be switched from the normal imaging mode to the composite imaging mode at a relatively low brightness rate (YM) by setting the gain (G) to a value less than 1. If, on the other hand, the sensitivity or S/N characteristics are bad, the imaging mode can be switched from the normal imaging mode to the composite imaging mode at a relatively high brightness rate (YM) by setting the gain (G) to a value greater than 1. Thus, an optimum composite image can be obtained in composite imaging mode regardless of the sensitivity or S/N characteristics.

In the foregoing, imaging apparatuses and imaging methods according to the first embodiment and the second embodiment have been described. If an object of a brightness difference that does not necessitate application of a wide dynamic range is imaged in composite imaging mode by an imaging apparatus having a wide dynamic range function in related art, an unnatural image due to reduced contrast of the pickup image is obtained. Therefore, appropriate control of switching timing from the normal imaging mode to the composite imaging mode has been desired.

According to the present embodiment, (1) the brightness rate (YM) of an object and (2) the exposure rate (EM) in composite imaging mode defined by an imaging system are used as determination conditions for automatically switching from the normal imaging mode to the composite imaging mode. Accordingly, the imaging mode can be switched from the normal imaging mode to the composite imaging mode in appropriate timing in accordance with the shutter speed set arbitrarily even if the exposure setting of the imaging apparatus is the shutter speed priority exposure. Thus, an optimum composite image can be obtained in composite imaging mode.

It should be understood by those skilled in the art that various modifications, combinations, sub-combinations and alterations may occur depending on design requirements and other factors insofar as they are within the scope of the appended claims or the equivalents thereof.

The present invention can be applied to, for example, a camera system that picks up dynamic images, but also to a camera system that picks up still images. For example, the present invention can be applied to any imaging device such as a digital video camera that images dynamic images, a digital still camera that images still images, and a mobile phone with a camera function. Even if a still image is picked up in set exposure mode, switching control of the imaging mode may be exercised, for example, during monitoring before imaging timing.

If, for example, imaging in non-interlaced scan is performed, processing in a field period described above can be considered as processing in a frame period. That is, the unit period in which an exposure image signal is obtained may be any unit period used by an imaging apparatus such as a field period, a frame period, a period of a plurality of fields, or a period of a plurality of frames. For example, a operation example in which detection processing, exposure correction processing, and exposure control processing are performed once in a period of a plurality of frame periods can be considered.

The present application contains subject matter related to that disclosed in Japanese Priority Patent Application JP 2008-234510 filed in the Japan Patent Office on Sep. 12, 2008, the entire content of which is hereby incorporated by reference.

What is claimed is:

1. An imaging apparatus, comprising:
   an imaging processing unit capable of selectively performing an imaging operation in normal imaging mode to generate one exposure image signal in one unit period and an imaging operation in composite imaging mode in which a long-time exposure image signal whose exposure time is relatively long and a short-time exposure image signal whose exposure time is relatively short are generated in the unit period and a composite image signal whose dynamic range is wider than that of at least the long-time exposure image signal or the short-time exposure image signal is generated by combining the long-time exposure image signal and the short-time exposure image signal; and
   a control unit that switches the imaging mode of the imaging processing unit from the normal imaging mode to the composite imaging mode based on a comparison result of a brightness rate of a bright portion and a dark portion of an object imaged by the imaging processing unit in the normal imaging mode and an exposure rate, which is a ratio of a long-time exposure time and a short-time exposure time in the composite imaging mode,
   wherein the control unit compares the brightness rate and a threshold representing a lower limit of the brightness rate at which switching from the normal imaging mode to the composite imaging mode becomes necessary, compares the brightness rate and the exposure rate if the brightness rate is equal to or greater than the threshold, and switches the imaging mode from the normal imaging mode to the composite imaging mode if the brightness rate is equal to or greater than the exposure rate.

2. The imaging apparatus according to claim 1, wherein the control unit
   compares a value obtained by multiplying the exposure rate by a gain set in accordance with sensitivity or S/N characteristics of the short-time exposure image signal and the brightness rate and
   switches the imaging mode from the normal imaging mode to the composite imaging mode if the brightness rate is equal to or greater than the value obtained by multiplying the exposure rate by the gain.

3. The imaging apparatus according to claim 1, wherein the control unit sets the long-time exposure time in the composite imaging mode in accordance with the exposure time set in the normal imaging mode when switched from the normal imaging mode to the composite imaging mode.

4. An imaging mode control method of an imaging apparatus capable of selectively performing an imaging operation in normal imaging mode to generate one exposure image signal in one unit period and an imaging operation in composite imaging mode in which a long-time exposure image signal whose exposure time is relatively long and a short-time exposure image signal whose exposure time is relatively short are generated in the unit period and a composite image signal whose dynamic range is wider than that of at least the long-time exposure image signal or the short-time exposure image signal is generated by combining the long-time exposure image signal and the short-time exposure image signal, comprising the steps of:
   calculating a brightness rate of a bright portion and a dark portion of an object by detecting the exposure image signal in the normal imaging mode;
   comparing the brightness rate and a threshold representing a lower limit of the brightness rate at which switching from the normal imaging mode to the composite imaging mode becomes necessary,
   comparing the brightness rate and an exposure rate if the brightness rate is equal to or greater than the threshold, and
   switching the imaging mode from the normal imaging mode to the composite imaging mode if the brightness rate is equal to or greater than the exposure rate.

* * * * *